Jan. 5, 1954 R. HIGONNET ET AL 2,664,986
APPARATUS FOR COMPOSING JUSTIFIED LINES
Filed Sept. 30, 1950 8 Sheets-Sheet 1

Fig. 1

Jan. 5, 1954　　　　R. HIGONNET ET AL　　　　2,664,986
APPARATUS FOR COMPOSING JUSTIFIED LINES
Filed Sept. 30, 1950　　　　　　　　　　　　　8 Sheets-Sheet 2

Inventors
René Higonnet & Louis Moyroud
By Kenway Jenney Witter & Hildreth
Attys

Fig. 5

Jan. 5, 1954  R. HIGONNET ET AL  2,664,986
APPARATUS FOR COMPOSING JUSTIFIED LINES
Filed Sept. 30, 1950  8 Sheets-Sheet 4

Jan. 5, 1954 R. HIGONNET ET AL 2,664,986
APPARATUS FOR COMPOSING JUSTIFIED LINES
Filed Sept. 30, 1950 8 Sheets-Sheet 5

Jan. 5, 1954 R. HIGONNET ET AL 2,664,986
APPARATUS FOR COMPOSING JUSTIFIED LINES
Filed Sept. 30, 1950 8 Sheets-Sheet 8

Inventors
René Higonnet + Louis Moyroud
By Kenway Jenney Witter & Hildreth
Attys.

UNITED STATES PATENT OFFICE 2,664,986

APPARATUS FOR COMPOSING JUSTIFIED LINES

René Higonnet and Louis Moyroud, Cambridge, Mass., assignors to Graphic Arts Research Foundation, Inc., Cambridge, Mass., a corporation of Delaware Application September 30, 1950, Serial No. 187,752

Claims priority, application France October 4, 1949

17 Claims. (Cl. 197—84)

The present invention relates to apparatus for composing justified lines and more particularly to improved justifiers of the type described in the copending application of Caldwell, Higonnet and Moyroud, Serial No. 140,208, filed January 24, 1950. These justifiers are principally adapted for use in photographic composing apparatus in which the characters in a line are photographed successively, and means are provided to space the successive projections by alternate movements of either the film or the projection equipment. An example of such apparatus is disclosed in our copending application, Serial No. 610,336, filed August 11, 1945.

To facilitate the disclosure of the invention the following definitions of the terms to be used are given at the outset. "Unjustified line length," as hereinafter used, means the sum of the widths of the characters in the line, plus minimum word intervals, also herein called "word spaces" or "interwords." "Justified line length" is the desired length of the lines. The "line deficit" is the difference between unjustified and justified line lengths. "Justification" is any process of dividing the line deficit into increments to be added to each interword or between characters. "Interword justification" is division of the line deficit between the word spaces alone; "intercharacter justification" is division of the line deficit between the characters alone; and "mixed justification" is division of the line deficit into two parts, one part being divided between the interwords and the other part being divided between the characters. The term "point set" refers to the distance requirements between successive characters in a word. "Point size" refers to the character dimensions. Point set usually increases and decreases with point size; but versatility in a composing machine should permit independent variations in point set where condensed or extended type, as well as normal type, is desired.

The present invention is therefore concerned with apparatus for justification having means for producing variable spacing between successive character projections, according to the widths of the respective characters and to the measured values of the justification increments.

Stated in broad terms, the functions of a justifier adapted for spacing successive character projections are: first, to accumulate, or add, the assigned widths of the characters (including, usually, some arbitrarily assigned minimum interword width) as they are selected by the compositor; second, after all the characters in a line have been selected, to measure the difference between the aggregate of such widths and a predetermined value corresponding to the justified line length; third, to divide the difference (or line deficit) by the number of units (whether word spaces or intercharacter spaces or both) into which the deficit is to be separated by the various projections; and fourth, to control the spacing between the character projections according to the widths of the characters, adding additional increments resulting from the division process in the selected positions for such increments (whether in the word spaces, or otherwise). It should not be overlooked, however, that the relationship between the justifier and the spacing mechanism imposes other practical requirements on the justifier. These include, for example, adaptations for changing the justified line length, for tabulation adjustment (centering of titles, margin shifts, etc.), and for changing point sizes or point sets.

In regard to the first two functions mentioned above, the present invention is to be distinguished from such devices as the Linotype, which provide a magazine of type matrices of various widths and a distribution system for stacking selected matrices between fixed abutments. It is also to be distinguished from devices of the calculating machine variety, which accumulate width values digitally in a counter. (See, for example, our copending application, Serial No. 70,472, filed January 12, 1949.) A feature of the present invention is accumulation of width values by an analogue displacement under the control of a device adapted to impart such displacements in variable amounts.

In regard to the last two functions, the present invention is to be distinguished from the so-called "discrete-unit justifiers" such as are described in our application, Serial No. 70,472, in which justification increments are limited to multiples of some basic width unit, usually because of the use of a variable escapement device for spacing the character projections. In the present invention the justification increments are not so limited.

A principal object of this invention is to perform the above functions so as to produce composed lines of exactly justified line length. The apparatus hereinafter to be described attains this object in a manner which may be understood more clearly by a comparison with character-by-character lead casting apparatus, such as the Monotype.

It is well known that in a Monotype machine, as each selected character is cast it is stacked alongside of other characters until the filled space is substantially equal to the justified line length. But, practically, the length of this line of castings differs from the theoretical value of the justified line. It must be assumed that each type, and each justification increment produced by the movements of the wedges to change the mold openings, differs from its assigned width value by some error value "e." Since the value of "e" is unique to each separate casting, it readily follows that, if the values of "e" are assigned numerical subscripts corresponding to the particular castings, the total error in the line length is $E = \Sigma n e_i$, where $n$ is the total number of castings in the line. From these considerations it is apparent that an exactly justified line would not be attained merely by assuming that the line deficit is equal to the difference between the theoretical values of justified and unjustified lines, as indicated on the scale of the tape punching machine and by the corresponding movements of the wedges on the casting machine. Accordingly, in Monotype apparatus, the final justification is determined not only by the movements of the wedges but by an added condition that the line, when justified, is rigidly compressed between two fixed abutments.

In contrast to this, the characters projected by a photographic composing apparatus cannot be subjected to a subsequent compression. Accordingly, depending upon whether the mode of accumulating selected character widths is digital or by analogues, two different methods of overcoming the error difficulties suggested above have been proposed.

According to the method utilized in the digital accumulator described in our above-mentioned application, Serial No. 70,472, theoretical character widths may be accumulated to determine a theoretical line deficit, as in the Monotype. The resultant spacing between the characters is accomplished through a variable escapement having a number of fixed stops, the escapement being successively actuated by theoretical character and justification width values. It is the property of such an escapement that its position after a number of actuations does not vary from its theoretically correct position by the algebraic summation of errors in individual movements, as indicated by the above equation. The final position of the escapement never varies from its theoretical position by more than the error (always negligible) in the final spacing movement. Thus, by the use of a variable escapement the individually negligible "noises" or errors in spacing are never algebraically accumulated to the point of noticeably obscuring the "signal," or theoretical line length. The "signal-to-noise ratio" is virtually infinite, to use the terminology of communications engineering.

Contrastingly, the analogue accumulation method proposed by the above-mentioned application, Serial No. 140,208 and by the present invention does not employ a variable escapement. A principal feature of the invention comprises a displacement accumulator having provision for displacing a cumulative amount by means of successive movements which correspond to various inputs including the widths of the characters in a line, means for measuring and dividing up the further amount of displacement necessary to achieve a predetermined aggregate therein corresponding to the length of a justified line, and means cooperating with the accumulator to produce displacements between the successive character projections so that the total displacement imparted will be equal to the predetermined aggregate. By these means, the accumulated displacement varies from a initial value or amount to a maximum value or amount, and eventually back to the initial value or amount in a complete cycle whereby the justification of a line is effected. Again, by reason of the fixed limits of movement of the accumulator, the "noise," or errors in the successive movements imparted to the spacing mechanism, are not algebraically accumulated to obscure the "signal," or ultimate line length as represented by the final position of the accumulator.

An additional object of the present invention is to provide an automatic justifying mechanism which is capable of making all interword increments in a line of exactly or substantially equal size.

Another object is to provide an automatic justifying mechanism with adjustable means for varying the justified line length.

Another object is to provide an automatic justifying mechanism capable of interword, intercharacter or mixed justification, as desired.

Another object is to provide an automatic justifying mechanism with provision for insertion of spacing to center short lines, such as titles, for insertion of spacing of predetermined length for cut inserts, and for alignment of short lines with either the left or right-hand margins.

Another object is to provide justifying apparatus adaptable to changes in point set at any point within a line.

Other features and objects of the invention relate to certain features of construction and modes of operation hereinafter described and particularly defined in the claims.

In the accompanying drawings.

Figure 1:
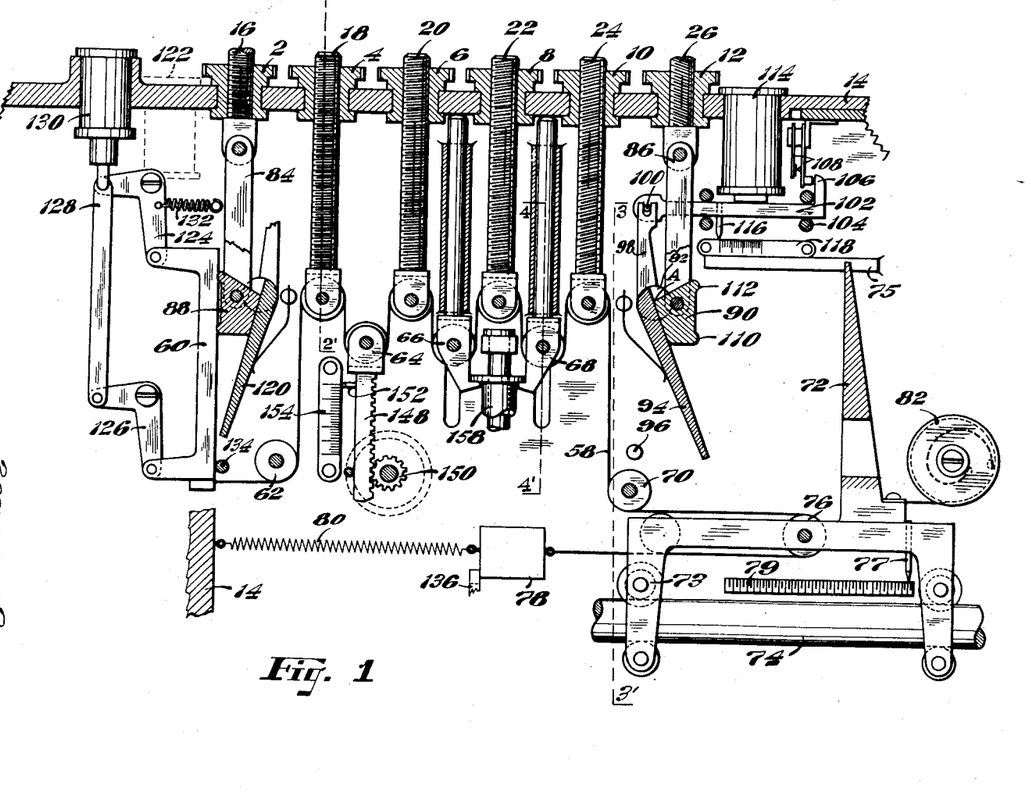
Fig. 1 is a sectional view of a first embodiment of the invention using a flexible strip in the accumulator.

Referring to Fig. 1, a set of pinions 2, 4, 6, 8, 10 and 12 are rotatably mounted in a stationary frame 14. A set of threaded rods 16, 18, 20, 22, 24 and 26 are received into these pinions. The rods 18, 20, 22, and 24 are referred to as the "storage rods," and their ends form pulleys capable of vertical displacements. The pulleys are used in a manner hereinafter to be more fully described to accumulate the widths of the selected characters. The pitches of the threads on the storage rods vary as the integral powers of two. Thus, for a given angular turn of each of the pinions 4, 6, 8 and 10, the advancements of the respective rods will vary as the integral powers of two. It will be evident that the binary storage system here indicated is not essential to the invention, and could be replaced by any suitable system capable of providing motion to one or more pulleys in proportion to various character widths. It has been found that the system of four pulleys shown in Fig. 1, which, as will hereinafter be shown, provides for fifteen distinct character widths for any assumed angular displacement of the pinions, is large enough in practice.

Figure 2:
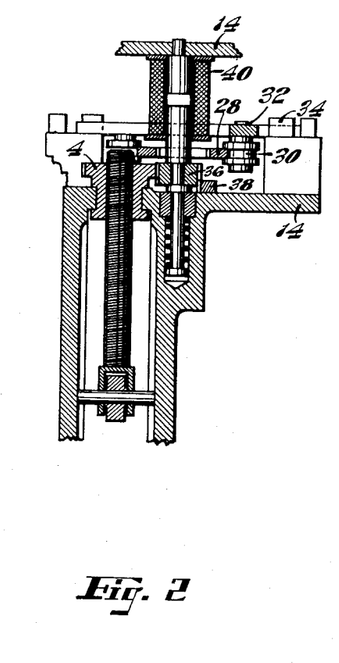
Fig. 2 is a section of Fig. 1 along the line 2—2', showing part of the mechanism actuating the pinion 4.
Figure 5:
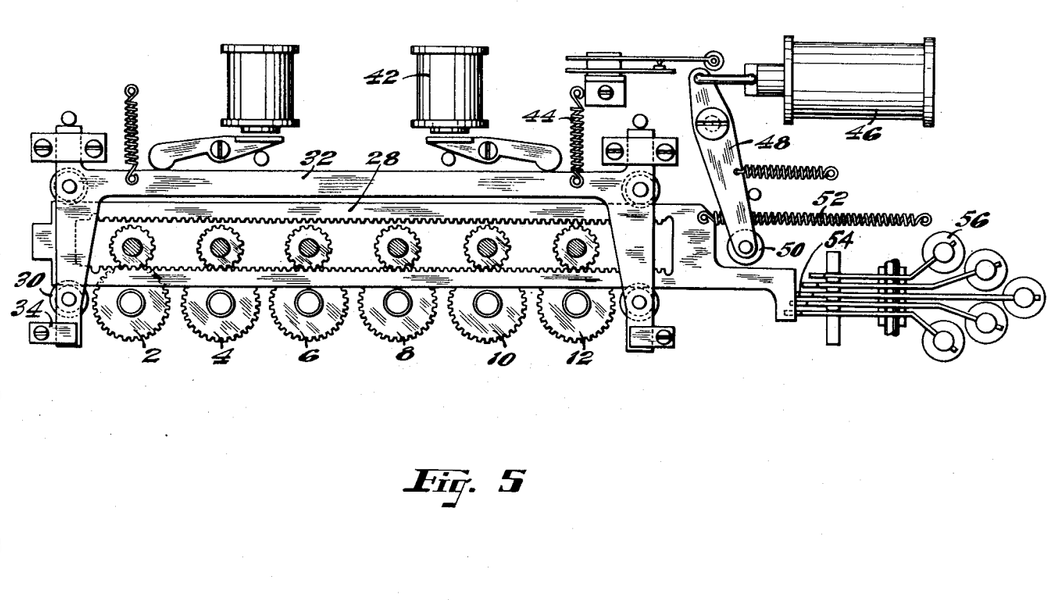
Fig. 5 is a top elevation of the embodiment of Fig. 1, showing part of the mechanism actuating the pinions.

Mechanism to drive the pinions 2 through 12 is shown in Figs. 2 and 5. In Fig. 5 a reciprocating rack 28 is mounted on four rollers such as roller 30, rotatably mounted on a frame 32. The frame 32 is slidably mounted on the frame 14 by means of four brackets such as bracket 34. A pinion 36, corresponding to the pinion 4 as shown in Fig. 2, is borne on a shaft forming at one end a plunger received into a recess in the frame 14. The plunger is spring-loaded to force the pinion 36 into mesh with the pinion 4 and a guiding tooth 38, fixed to the frame 14. By energization of a magnet 40 the pinion 36 is moved free of the tooth 38 and reaches a position in mesh with both the pinion 4 and the rack 28. The rack 28 meshes with the pinion 36 on either of two toothed edges, depending upon the position of the slidable frame 32. This position is governed by the action of two magnets such as magnet 42, and two springs such as spring 44. The other pinions are rotated in a similar manner to that of the pinion 4.

A magnet 46, when energized, rotates a lever 48 through a fixed angle determined by the physical limits of the lever and the movable core of the magnet. Through a roller 50 at the end of the lever motion is imparted to the rack 28, causing it to translate with respect to the frame 32 by a fixed distance. This distance depends in part upon the initial position of the rack 28, since the roller 50 is not initially in contact with the rack. By action of a spring 52 the rack 28 will have reached its initial position against one of five stop levers such as lever 54, these levers being operated by magnets such as magnet 56. When these magnets are deenergized their respective levers are out of the path of the rack 28; when one of the magnets is energized its lever moves into the path of the rack 28 and stops it, thereby fixing the initial position of the rack.

Turning to Fig. 1, a flexible strip 58, which is relatively stiff under tension and is preferably a steel tape, is fastened at one end to a follower bar 60 and is wrapped between the pulleys on the storage rods and other pulleys 62, 64, 66, 68 and 70, the pulleys 62 and 70 being fixed to the frame 14. The strip is then connected with a laterally movable follower bar 72 mounted with a set of four rollers 73 on a fixed rail 74. The connection to the follower is made through a roller 76 rotatably fixed to the follower. The follower is guided at its upper end between a pair of rails, of which only one, namely rail 75, is shown. A pointer 77, fastened to the follower, is placed opposite a fixed scale 79. The end of the strip is secured to a projection displacement member 78, which may be a film carriage as described in our copending application, Serial No. 770,320, filed August 23, 1947, or a sliding prism as described in the copending application of Caldwell, Hegonnet and Moyroud, Serial No. 148,901, filed March 10, 1950. The function of the member 78 is to displace the successive character projections under the control of the flexible strip. A spring 80 fixed to the frame 14 and to the member 78, and a coil spring 82 tending to urge the member 72 to the right provide means for keeping the flexible strip under tension.

To each of the possible selected characters in the composing machine is assigned a width value of from one to fifteen units. These limits are defined by the presence of only four binary stages in the accumulator and may be increased, as above indicated, if a higher order counting system or more stages are employed. When a particular character is selected at the keyboard by the compositor a set of permutation bars, well known in the telegraphic art, is actuated to energize the particular combination of the magnets such as 40 (Fig. 2) representing the width of the character. At the same time one of the magnets 56 (Fig. 5) is energized according to the point set selected for the spacing between successive character projections. Preferably after a slight time delay the magnet 46 is automatically energized, in consequence of which the rack moves to the left and causes the selected storage rods to be withdrawn upwards to pull between the pulleys an additional length of the strip proportional to the assigned character width value and to the point set. When the next character is stored the rack moves to the right, engaging the selected pinions such as 40 on the opposite toothed edge. This result is produced by energization of the magnets such as 42.

An important feature of the rack assembly shown in Fig. 5 relates to the speed with which successive movements of the storage rods may be produced. As above indicated, the storage of each character width value is produced by a single movement of the rack 28, either to the left or to the right. That is, the rack does not reciprocate on each separate entry; yet, the pinions continue to rotate in the same direction as long as character widths are being stored by reason of the energization of the magnets 42 on alternate movements of the rack. The speed with which successive width entries may be introduced is a direct result of this economy of motion.

The pinion 2 (Fig. 1) counts the number of characters in the line and is used for intercharacter and mixed justification. Details of these types of justification are described hereinafter in greater detail. The pinion 12 counts the interwords. In other words, the pinion 12 is rotated through an angle determined by the selected point set whenever the space bar is struck, and the pinion 2 is rotated through a similar angle whenever either a character key or the space bar is struck. Note that the mechanism actuating the pinions 2 and 12 is the same as that which actuates the pinions 4 through 10.

Figure 3:
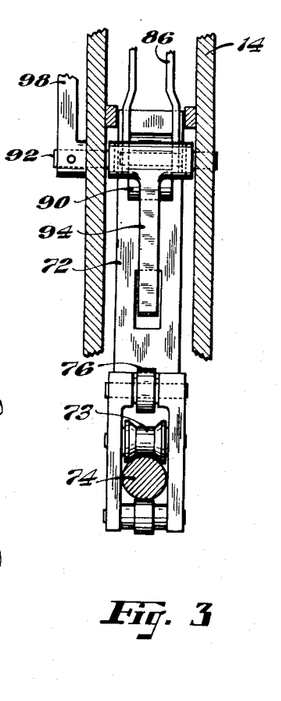
Fig. 3 is a section of Fig. 1 along the line 3—3'.

Referring to Figs. 1 and 3, the two threaded rods 16 and 26, which are received in the pinions 2 and 12 respectively, are journaled to two links 84 and 86, which are in turn journaled to wedge-blocks 88 and 90, respectively. The block 90 is shown in a position wherein its edge A passes through the axis of rotation of a shaft 92, rotatable in the frame. A spring-loaded rocking lever 94 is secured to the shaft 92 and bears upon the block 90 as shown. A fixed stop pin 96 limits the extreme position of the lever 94 to a position in which its bearing surface is vertical, as shown in Fig. 6. A forked arm 98 is also secured to the shaft 92. The arm 98 cooperates with a pin 100 extending from a sliding bar 102, which is retained by four stop pins 104.

A tail 106 on the bar is adapted to close a pair of contacts 108, which are used to ring a bell or to actuate other means of warning the compositor, for reasons which will hereinafter be described. The tail 106 also fixes the slope of the lever 94, which tends to rotate counterclockwise under the force of its spring, to that slope which brings the left-hand surface of the block 90 into contact with the lever when a pair of feet 110 and 112 on the block 90 are vertically aligned, as shown in Fig. 1. A magnet 114 provides a means of gripping the bar 102 magnetically to hold it in any position within its limits of movement. A pointer 116 fastened to the bar 102 is placed opposite a fixed scale 118.

The block 88, which is identical with the block 90, is shown in a position in which it bears upon a rocking lever 120 identical with the lever 94. The mechanism associated with the lever 120 is shown in part only; that is, the parts corresponding to the arm 98 and the sliding bar 102 are omitted from the drawing. However, these elements are identical with the arm 98 and the bar 102. The gripping magnet shown in dotted lines at 122 corresponds with the magnet 114. Two bell-crank levers 124 and 126, pivoted to the frame, are each attached at one end to a connecting rod 128 which is connected to the movable core of a magnet 130. The bell-crank levers are each connected at the other end to the laterally-movable follower bar 60. When the magnet 130 is not energized, a spring 132 attached to the frame 14 and to the lever 124 forces the follower bar 60 against a fixed stop pin 134.

The operation of the justifier is conveniently divided into two cycles. During the first, or storage cycle, the operator successively depresses the selected keys of the keyboard, thereby operating a set of permutation bars, as mentioned above. These bars perform two functions. The first function, with which the present invention is not concerned, is to actuate the storage unit or register, which may be of the type shown in our application, Serial No. 610,336, above mentioned. The second function is to energize the magnets 40 (Fig. 2) according to the binary representations of the widths of the selected characters. This causes cumulative linear displacements of the flexible strip which are proportional to the widths of the selected characters. During this cycle the member 78 is held by the spring 80 against a movable stop 136, and the displacement of the flexible strip results in a proportionate displacement of the follower 72 toward the left.

Each time the space bar is depressed, the combination of the magnets 40 representing the minimum interword are energized, and in addition the pinion 12 is turned to cause the block 90 to advance a certain distance depending on the point set. Each time a character key or the space bar is depressed the block 88 is similarly advanced a certain distance.

At the end of the storage cycle the positions reached by the follower 72 and the blocks 88 and 90 determine the justification increments in a manner to be described.

During the second, or transcription cycle, the reading unit in the register reads the composed characters successively and provides successive impulses to the sets of magnets such as 40 (Fig. 2), which cause the return of the storage rods to their original positions. As it will be presently shown, the word-space and character-counting pinions 2 and 12 will also have been gradually returned to their original positions by the end of the transcription cycle. During this cycle the character displacement member 78, which has been released by the stop 136, is drawn to the left by the spring 80 as the flexible strip is released, to produce the desired spacing between the characters.

By connections with which the present invention is not concerned, the reading unit of the register also provides impulses to a projection unit of the type described in our application, Serial No. 610,336, above mentioned. The successive movements of the character displacement member 78 are timed to occur alternately with the successive character projections.

The motions of the follower 72 and related parts during the storage and transcription cycles are described in more detail by reference to Figs. 1, 7, 8 and 9. At the start of the storage cycle the follower 72 is in the position shown in Fig. 1 and also in Fig. 7. During the storage cycle it moves to the left by distances corresponding to the widths of the characters and minimum interwords as they are stored. While these movements are taking place the block 90 is being moved by the advancement of the threaded rod 26 at each interword from the initial position shown in Fig. 1. The magnet 114 being unenergized, the lever 94 is free to rotate under the force of its spring until stopped by the tail 106. In this position it bears upon the block 90 along a surface of the block. As the interwords are stored, the block 90 moves downward along the surface of the lever 94. The block 90 is rotatable within a fixed angle with respect to the link 86; therefore, each movement of the pinion 12 produces a movement of the block 90 along the lever 94, which remains stationary, and the lever maintains contact with the block along the original surface of contact.

Figure 8:
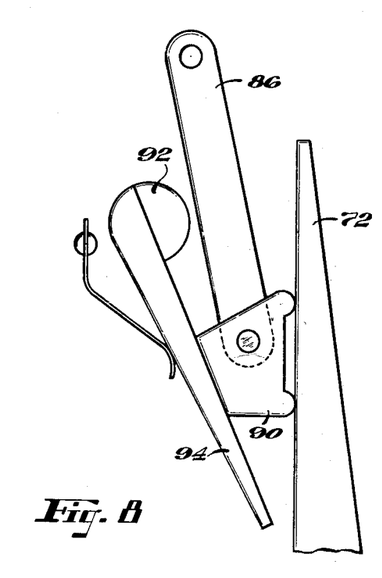
Fig. 8 is a view of a part of the embodiment of Fig. 1 at an instant near the end of the storage cycle.
Figure 9:
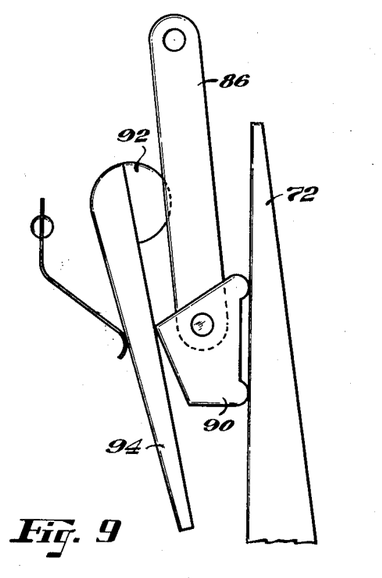
Fig. 9 is a view of a part of the embodiment of Fig. 1 at the end of the storage cycle.

The respective movements mentioned above continue until the block comes in contact with the follower 72 as shown in Fig. 8. As additional characters are stored and the follower moves further to the left, the lever 94 is rotated until it bears upon the block 90 only along the edge A, as shown in Fig. 9. The elements are in the positions shown in Fig. 9 and as dotted lines in Fig. 7 at the end of the storage cycle. At the end of the transcription cycle, these elements will have reached the positions shown in Fig. 7, through the reversed movements of the pinion 12 as hereinafter described.

Therefore, the follower 72 is a measuring device which accumulates the total number of units in the unjustified line during the storage cycle, and which cooperates with the wedge-block to control the division of the line deficit among the interwords during the transcription cycle, as will hereinafter be explained in further detail. It will be noted that the justification increments depend upon both the number of interwords in the line and the value of the line deficit.

It will be clear that the use of a wedge-block as shown in the drawings is not essential to the invention, since other devices having a similar function may be substituted. For example, an alternative hydraulic device is disclosed in our above-mentioned application, Serial No. 140,208. It is also possible to replace the wedge-block with a cam having a surface adapted to permit the above-described movements of the follower during the transcription cycle.

The motions of the follower bar 60 are in certain respects similar to the motions of the follower 72, and are described hereinafter in connection with the description of the operation of the justifier.

We now turn to a description of the operation of the justifier as a unit. At the beginning of the storage cycle all components of the justifier are in the positions shown in Fig. 1. No magnets are energized. The spring 80 being more than half as strong as the spring 82, the member 78 is urged against the stop 136.

It will first be assumed that "interword justification" is desired; that is, justification where the line deficit is divided only among the interwords.

When the operator selects the first character to be stored, the pinions 4, 6, 8 and 10, corresponding to the binary representation of the character width, are caused to turn through angles dependent upon the point set, as described above. As a result, the storage rods will displace a length of the flexible strip representing the width of the stored character. This causes the follower 72 to displace a distance proportional to the character width, against the tension of the spring 82. Simultaneously with the turning of the above-mentioned pinions, the pinion 2 is moved through a fixed angle, as mentioned above, thus causing the block 88 to move downwardly along the surface of the follower 60, and turning the lever 120. The tension of the spring 132 is sufficient to keep the follower 60 from moving to the left, and the follower therefore remains against the stop pin 134.

When the second and successive characters are selected, the process is identical with that described above. As mentioned above, the advancements of the threaded rod 16 are equal, regardless of the character widths, but they produce no movement in the follower 60.

When the compositor ends a word, a space bar is pushed, with the result that the combination of storage rods representing the minimum interword space are withdrawn upwards. The pinion 2 is also turned, as above. In addition, the interword-counting pinion 12 is turned a fixed amount, causing the block 90 to move downward along the surface of the lever 94.

The process thus described continues until the follower 72 reaches a position such as is shown in Fig. 8, at which point it comes into contact with the block 90. When this happens it begins to exert torque on the lever 94, which in turn moves the sliding bar 102. Additional movement of the follower 72 eventually results in the opening of the contacts 108 at which point the elements will have reached positions as shown in Fig. 9. When these contacts open the operator is warned by a bell or similar signal actuated by the contacts, and stores thereafter only the characters remaining in the word. He then energizes the magnet 114. This marks the end of the storage cycle and fixes the slope of the lever 94, which is not changed until the end of the transcription cycle.

The transcription cycle begins with the downward withdrawal of the stop 136 (Fig. 1), but there is no initial movement of the member 78, since the flexible strip is held between the pulleys. During this cycle, as each stored character is transcribed or projected into permanent form, the combination of the rods 18, 20, 22 and 24 corresponding to the character width are returned a certain distance to release the flexible strip, thereby causing the member 78 to move to the left. The reversal of the storage rod movements to return them toward their original positions is accomplished simply by changing the order of actuation of the magnets 42 and 46 (see Fig. 5). That is, in order to return the rods to their original positions it is only necessary to change the sequence of actuation of the magnets 42 and 46 so that, for example, instead of actuating the magnet 42 each time the rack 28 moves to the right, it is actuated each time the rack moves to the left. This method of producing the reversal of movement of the pinions 2 through 12 thus constitutes an important aspect of the above-described feature of the invention whereby each successive movement of the pinions is produced without the reciprocating action of any of the mechanical parts. The turning of the pinions to return the rods for each character or word space is accompanied by the turning of the pinion 2 through a fixed angle. This causes the block 88 to move toward its initial position along the follower 60, but produces no resultant movement of the member 78.

Figures 6, 7:
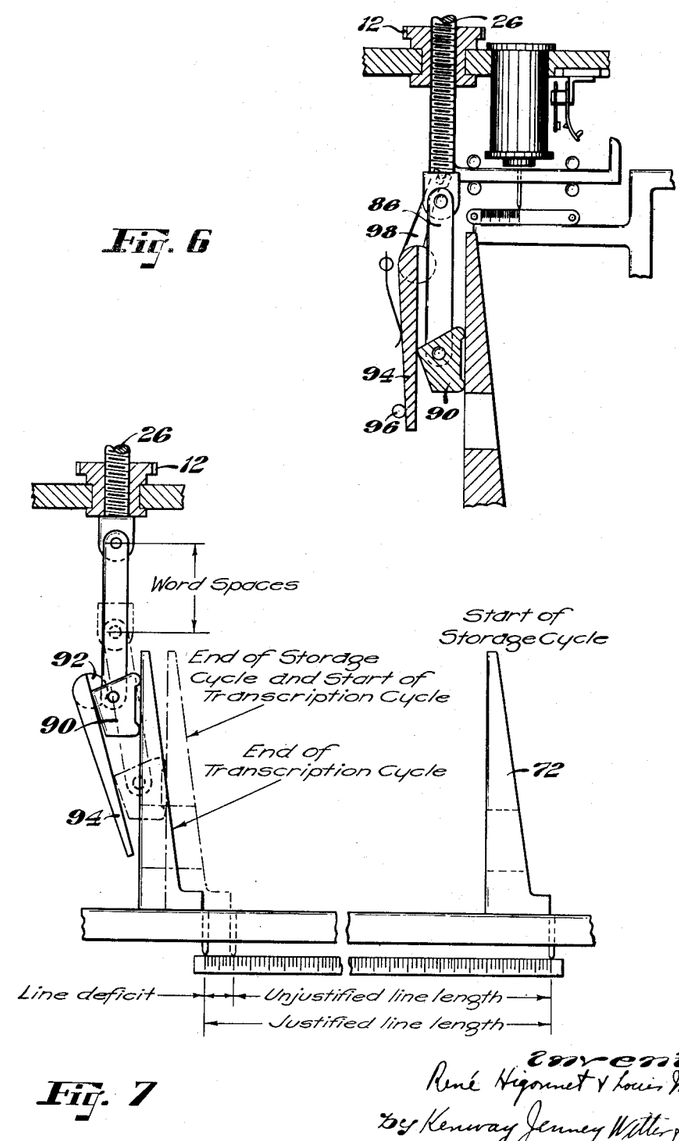
Fig. 6 is a view of a part of the embodiment of Fig. 1 in position for zero interword justification increments.
Fig. 7 is a view of a part of the embodiment of Fig. 1 in three transitional positions.

When a word space is reached, in addition to the widthdrawal of the rods to produce the minimum interword, the pinion 12 is turned through a fixed angle, again depending upon the point set. This causes the wedge-block 90 to be withdrawn along the surface of the lever 94, and since the lever 94 is fixed, the follower 72 is moved to the left. This produces a movement of the member 78, and the word space is thus increased over the minimum interword by a certain distance depending upon the slope of the lever 94. It is evident that, after the final movement of the pinion 12, in the transcription of a line, the block 90 will have reached a position with its edge A again in the axis of the shaft 92, as shown in Fig. 7. It is also evident that the total distance which is displaced by the follower 72 during the two cycles represents the length of a justified line, since all storage rods will have reached their initial positions when the last character in the line is transcribed.

The justifier is reset to begin a new storage cycle by moving the follower 72 to the right, thereby moving the member 78 to its original position as shown in Fig. 1, where it is reengaged by the stop 136.

From the foregoing description it will be evident that the present invention makes readily possible a change in the point set of the characters at any point within a line. For example, it may be desired to increase the point sizes of several words without changing the font, or to condense or extend certain characters, or to change to a different font in a different point size. If for any such reason a change in point set is desired, it is also desirable to change proportionately the justification increments between the words in the new font. The present invention produces this result automatically, since, as above noted, the vertical movements of the wedge-block 90 are themselves proportional to the point set of the characters being transcribed.

It will also be noted in connection with the description to follow that the proportionate changes in the justification increments due to changes in the point set are produced when the increments are between the characters as well as between the words.

It will next be assumed that "mixed justification" of a line is desired; that is, justification where part of the line deficit is taken up between the individual characters. The most common use of mixed justification arises where the compositor, during the storage cycle, comes to the end of a word or hyphenation point prior to the opening of the contacts 108 and realizes that, should sufficient additional characters be stored to open the contacts 108, the follower 72 would then have to move beyond the limiting position as shown in Fig. 6 before the next end-of-word or hyphenation point would be reached. When this situation raises, the magnet 130 is energized, thus causing the follower 60 to move toward the left (see Fig. 1). This movement is transmitted through the flexible strip to the follower 72, which advances toward the left until the contacts 108 are opened. At this point the magnet 122 is energized and the magnet 130 is deenergized. The movement to the left of the follower 60 is thus stopped, and it is prevented from moving back by the obstruction of the lever 120 which is now made rigid by the energization of the magnet 122. The magnet 114 is also energized to make the lever 94 rigid, as heretofore described.

The transcription cycle proceeds as for interword justification except for the effect of the movement of the block 88. During interword justification this block has no effect on the flexible strip. For mixed justification, however, as each character or word space is transcribed, the turning of the pinion 2 as described above causes the withdrawal upward of the block 88 along the surface of the lever 120. This in turn causes the follower 60 to move to the right toward its original position, and adds incremental spaces between the characters, depending upon the slope of the lever 120 and the point set of the particular character as reflected in the positions of the levers 56 (Fig. 5). Thus, the movements of the block 88 and related parts may be regarded as providing means for changing the point set.

It is to be noted that the intercharacter increments thus produced will not in general be equal in size to the interword increments. In fact, if it is desired, the interword increments may be reduced to zero, to produce the minimum interword and thereby to bring about what is called "intercharacter justification." This only requires that the operator allow the magnet 130 to cause the follower 60 to advance toward the left until the follower 72 reaches the position shown in Fig. 6, which is beyond the point at which the contacts 108 are opened.

An important feature of the invention which will be appreciated from the foregoing description relates to the manner in which the justifier is operated to correct an erroneous character entry. If an error in a character entry is discovered before the transcription cycle is begun, it is necessary both to erase the entry from the register and to subtract the corresponding width entry from the justifier. This subtraction is accomplished by the present invention simply by energizing the magnets 42 and 46 in the same sequence as they are energized during the transcription cycle, and by causing the selected storage rods to release the length of the flexible strip corresponding to the width of the erased character. Thus, the invention is adapted for character correction without the need for any additional equipment, other than that heretofore described.

Figure 10:
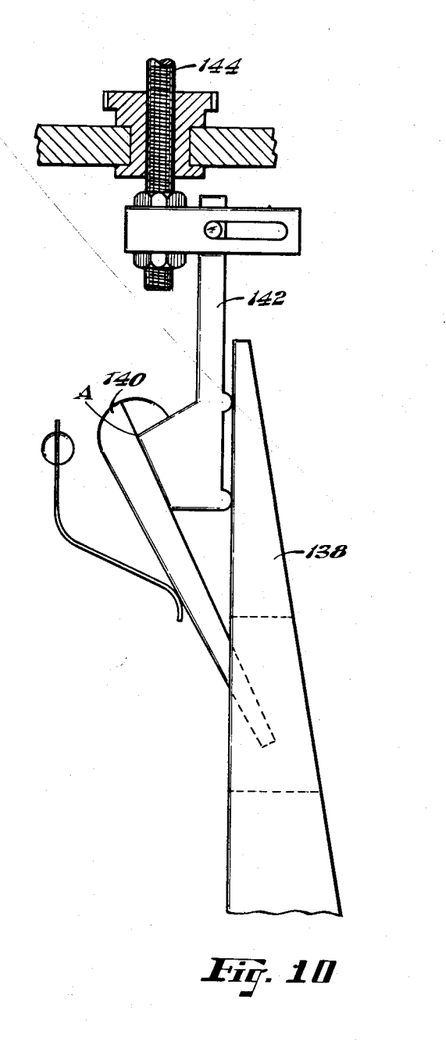
Fig. 10 is a view of an alternative dividing mechanism.

It is evident that the theoretical limitations of the mechanism including the follower 72, the lever 94, the wedge-block 90, and related parts, do not permit the incremental increases in width for each of the interwords during transcription to be exactly equal, even if the point set remains unchanged. This is caused by the fact that successive equal retractions of the threaded rod 26 do not produce successive movements of the block 90 with equal vertical components. This variation may be decreased or eliminated entirely, if this is considered desirable. The variation is decreased by lengthening the link 86, and eliminated entirely by the substitution of mechanism of the type shown in Fig. 10, or a pantographic mechanism, as will be clear to those familiar with the art. In Fig. 10 the follower 138 corresponds with the follower 72 in Fig. 1, the lever 140 with the lever 94, the block 142 with the block 90, and the rod 144 with the rod 26. The above considerations also apply to the mechanism associated with the follower 60, the lever 120, the block 88, and related elements.

Figure 13:
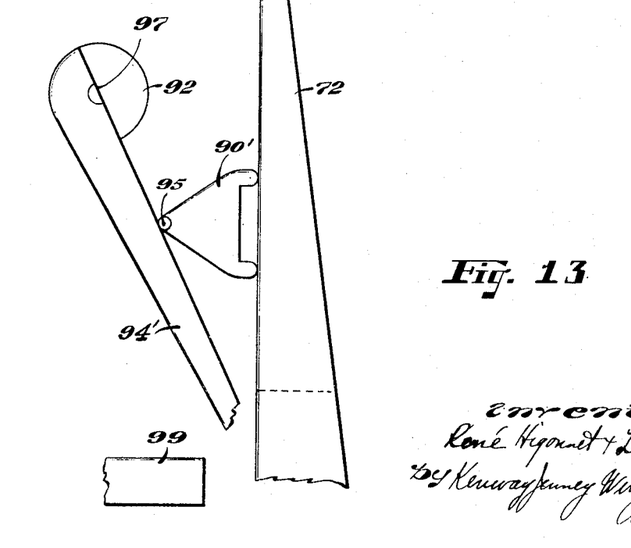
Fig. 13 shows an alternative form of dividing mechanism.

In actual practice, it is preferable to employ a wedge-block of modified design, instead of the block shown in Fig. 1. The modified block is shown as 90' in Fig. 13. This block is adapted to roll on a roller 95 along the surface of a lever 94'. This lever is similar to the lever 94 in Fig. 1, except that the lever 94' is provided with a semicircular notch 97 having its center in the axis of the shaft 92. By reason of this notch the bearing line of the roller will reach and fall into a position beyond the axis of the shaft 92 in its final movement at the end of the transcription cycle. A fixed abutment 99, however, stops the follower 72 so that it does not follow the block after the roller enters the notch. The abutment insures an accurate extreme position of the follower which results in a very accurate margin in the printed page. It will be realized that the notch must be of a sufficiently small radius that the roller will fall into the notch only on the final movement of the block, after which the follower will rest against the abutment 99. Thus, the radius is a function of the smallest vertical movement which may be imparted to the block 90', which is in turn a function of the smallest point set available in the justifier.

A more efficient variant of the invention utilizes the member 78 shown in Fig. 1 alternately for the transcription cycles of two separate justifiers such as that described above. To accomplish this the flexible strip of each justifier is not directly connected to the member 78, but to another member having a clutch for engaging the member 78 on alternate cycles. During the transcription cycle of one justifier the compositor may store the characters for the succeeding line, operating upon the other justifier in the manner described above. Thus, at the end of the transcription cycle of each justifier the character displacement member 78 may immediately commence upon the transcription cycle of the other justifier.

Figure 14:
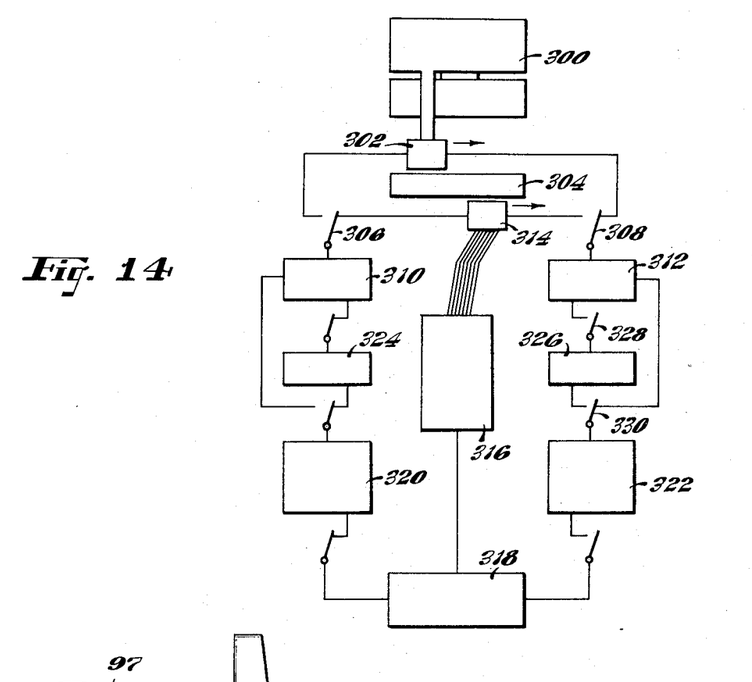
Fig. 14 is a block diagram of a composing machine using two justifiers according to the present invention.

Fig. 14 shows a specific arrangement of elements in a photographic type composing machine using two justifiers in the manner described. A keyboard 300 supports a writing unit 302 having means for writing information corresponding to the selected characters upon a fixed register 304. The writing unit has connections through two switches 306 and 308 to two variable motion units 310 and 312 corresponding to the mechanism shown in Fig. 5. A reading unit 314 having provision to detect the information stored in the register has connections to the opposite contacts of the switches 306 and 308 and to a decoding unit 316 having provision for converting the information into a usable form for a photographic unit 318 to which it is connected. The variable motion devices 310 and 312 are connected to two justifiers 320 and 322 in the manner already described. Reversal of either justifier is produced by a connection from each variable motion device through a reversing device 324 or 326. These latter devices change the sequence of energization of the magnets 42 and 46 as described above.

All of the switches shown in Fig. 14 are assumed to be ganged under normal operating conditions. Thus, with the contacts as shown in the figure, the keyboard actuates the writing unit which in turn actuates the variable motion device 312 through the switch 308. The justifier 322 is thus operated in a storage cycle. Simultaneously, the reading unit 314 actuates the variable motion device 310 through the switch 306, and thus reads information corresponding to the previously stored line into the justifier 320, which operates in a transcription cycle through the reversing device 324. Information relating to the previous line is also read through the decoding unit 316 to the photographic unit 318. The photographic unit is operated alternately with the justifier 320, as already mentioned.

If it is desired to correct an error in the justifier 322 during its storage cycle, the compositor simply moves the writing unit 302, which is preferably fixed to the platen of a non-justifying typewriter, to the position on the register in which the erroneous character is stored. Two switches 328 and 330 are then thrown to the left and the erroneous width value is read by a special sensing device on the writing unit and subtracted from the justifier. The switches are then thrown to the right, after which a correct character entry may be made.

It will be evident from the foregoing description that the present invention utilizes a principle whereby certain inaccuracies in the movements of the functional components are automatically compensated for in such a manner that line length is unaffected. For instance, assume that the pinion 10 is turned by a certain additional error increment $e$ each time it is actuated by the rack 28. If this pinion turns five times in a storage cycle, the excess length of flexible strip taken up will be proportional to 49$e$. During the transcription cycle, however, the follower 72 will displace the remaining distance necessary to cause a correct total displacement. During the transcription cycle, each time the pinion 10 is turned it will displace more than the theoretically correct length of the strip and produce a larger space than desired; but nevertheless, the total displacement of the character displacement member 78 will be exactly equal to the justified line length, the error having been divided among all the interword increments in the line.

It is evident from the above that the scale 79 (Fig. 1) may be calibrated to read either the line deficit or the unjustified line length, and that the scale 118 may be calibrated to read either the sizes of interwords or of interword increments.

Adjustment of the justified line length is provided for by the pulley 64. This pulley is translatably connected to the frame 14 through a rack 148 and a pinion 150, the latter being rotatably fixed to the frame 14. A pointer 152 fastened to the rack 148 is placed opposite a justified line length scale 154.

Figure 4:
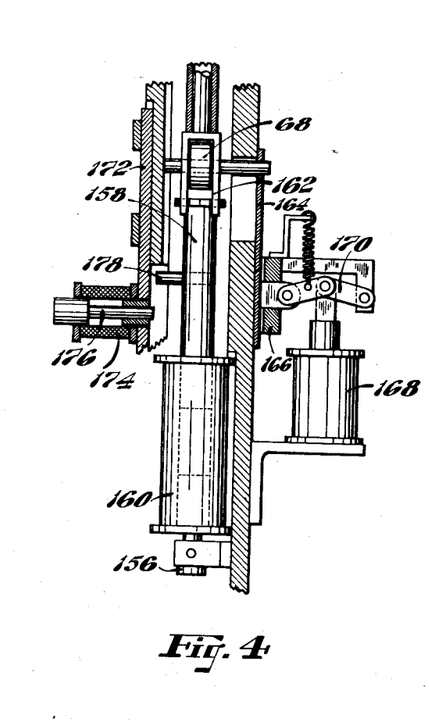
Fig. 4 is a section of Fig. 1 along the line 4—4', showing the mechanism actuating the sleeve 158 and related components.

Short lines are necessary for a variety of purposes, such as for titles or where cuts are to be inserted. This requires additional means to provide the necessary spaces. For these purposes the spacing pulleys 66 and 68 (Figs. 1 and 4) are used. As shown in Fig. 4, a post 156 is rigidly fixed to the frame 14 and slidably bears a flanged sleeve 158. The sleeve and post are inserted into a magnet 160 which, when energized, exerts a force tending to draw the sleeve downward into the magnet. The pulleys 66 and 68 are supported by extensions of two rods, the rods being slidably mounted in sleeves integral with the frame 14. In the positions shown in Fig. 1 the rods bear against a surface of the frame 14. The extensions of the rods have hooks such as hook 162 which extend beneath the flange on the sleeve 158. The axles of the pulleys 66 and 68 extend at one end into guide grooves in the frame 14 and at the other end through slots in the frame 14. Outside of these slots the axles are fixed to sliding plates such as plate 164. As shown in Fig. 4, movement of the pulley 68 causes the plate 164 to slide beneath a pressure block 166. The pulley 68 may be fixed at any position within its limits of movement by the energization of a magnet 168 which, through a linkage 170 and the block 166, applies pressure to the plate 164.

A plate 172, adjustably fixed to the frame 14, bears a magnet 174. Energization of the magnet drives a plunger 176, otherwise spring-loaded to move away from the sleeve 158, toward the sleeve. Its motion is arrested at a point sufficiently close to the sleeve to cause it to abut against a pin 178 fixed to the sleeve. Thus, upon the energization of the magnet 160 the travel of the sleeve 158 may be controlled by the position of the plate 172 on the frame 14, provided that the magnet 160 is energized.

First, assume that a space of predetermined length is needed in the line, as for a cut insert. The compositor begins the storage cycle in such a case by adjusting the plate 172 and energizing the magnet 160. Thus, the pulleys 66 and 68 are both drawn down by a fixed distance. The balance of the line is then composed as described above.

During the transcription cycle, at the point in the line where the space is desired, the compositor releases both pulleys by deenergizing the magnet 160, thus allowing the pulleys to move upward until stopped by the frame 14. The resulting movement of the flexible strip creates the desired space in the transcribed line.

In the case of titles, the space is not of predetermined length, but the number of characters is fixed. These characters should be centered in the line. The compositor begins the storage cycle in such a case by first storing the characters. The magnet 160 is then energized and the pulleys 66 and 68 are driven down until the follower 72 reaches the position shown in Fig. 6. (In this case, there will be no interword justification; but it is evident that appropriate adjustment might be made to permit such justification by simply providing for only sufficient displacement of the follower 72 to cause the opening of the contacts 108.) The pulleys are held down by energization of the magnet 168.

During the transcription cycle the pulley 68 is released first by deenergizing the magnet 168. The characters are then transcribed, as described above. After the characters are transcribed the pulley 66 is similarly released, thus causing the title to be exactly centered in the line.

Figure 11:
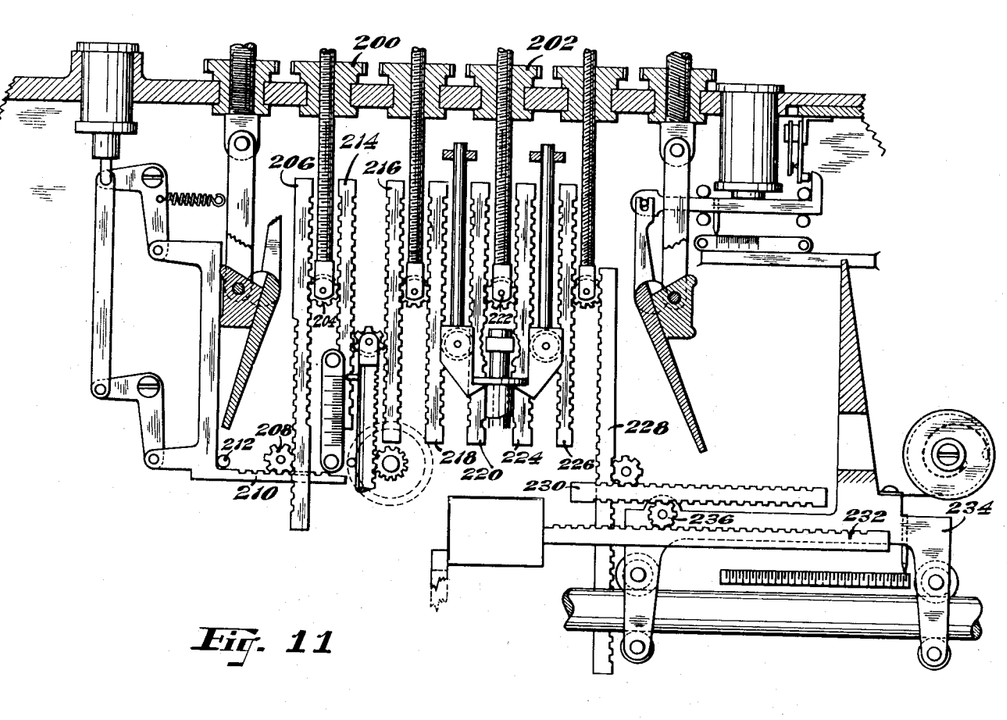
Fig. 11 is a sectional view of a second embodiment of the invention using racks and pinions in the accumulator.

The alternative embodiment of Fig. 11 functions in substantially the same manner as the embodiment described above in connection with Fig. 1. Here, however, the flexible strip is replaced by a combination of racks and pinions. Each of the racks shown is supported to slide in the direction of its principal dimension. The manner in which these movements are produced may be seen by considering the storage of a given character, by way of example.

The width of the character is arbitrarily selected as five units. In terms of a binary representation, this corresponds to the rotation of the pinions 200 and 202. The resultant upward thrust of a pinion 204 on a rack 206 produces counterclockwise torque on a pinion 208, rotatably fixed to the frame. This pinion, however, cannot turn because a rack 210 in mesh therewith is against a stop pin 212. The rack 206 will thus remain stationary, and will cause the pinion 204 to rotate counterclockwise as it moves upward. This imparts upward movement to a rack 214, downward movement to a rack 216, upward movement to a rack 218, and downward movement to a rack 220. A pinion 222 moves upward because of the rotation of the pinion 202. Thus, there is imparted to a rack 224 a motion proportional to the sum of the movements of the pinion 222 and the rack 220. The rack 224 imparts downward movement to a rack 226, upward movement to a rack 228, movement to the left to a rack 230; and because of the stationary position of a rack 232, movement to the left to a follower 234 through a spacing pinion 236, rotatably fixed to the follower.

Figure 12:
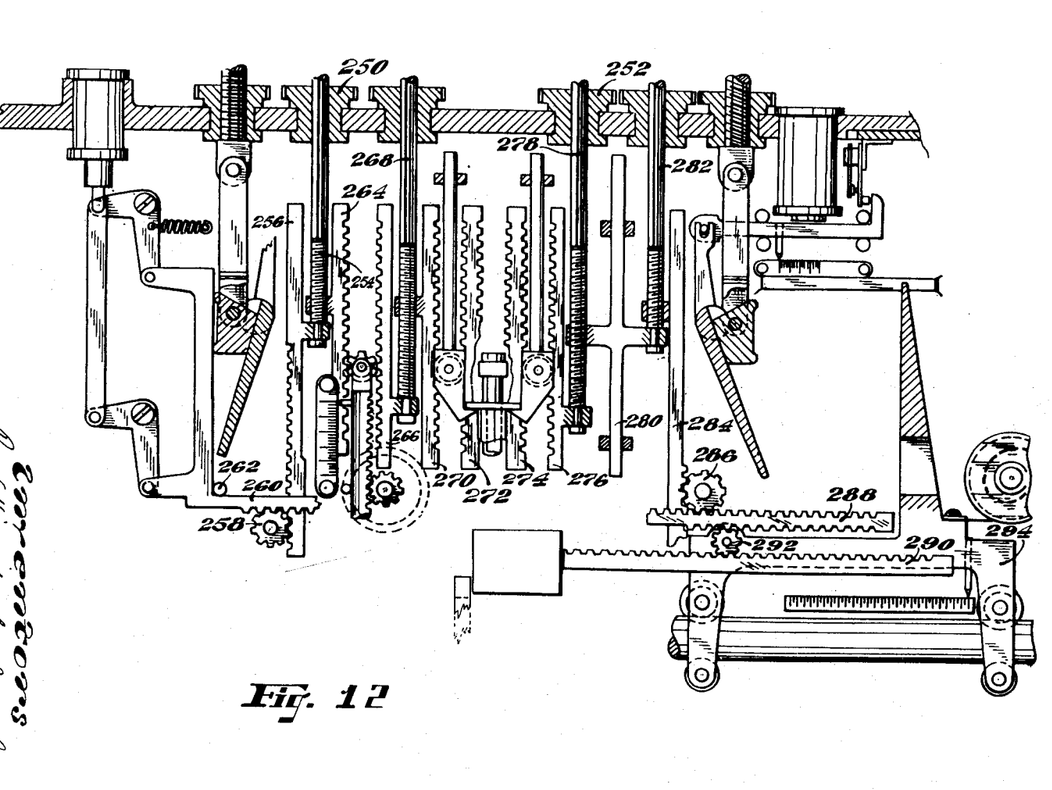
Fig. 12 is a sectional view of a third embodiment of the invention using racks with threaded and splined rods in the accumulator.

The alternative embodiment of Fig. 12 functions in substantially the same manner as the two embodiments described above. Here, the flexible strip is replaced by a combination of racks and splined and threaded rods. Each of the racks shown is supported to slide in the direction of its principal dimension. Each rod, such as the rod 254, is slidably splined to its turning pinion, such as the pinion 250. The manner in which these movements are produced may be seen by considering the storage of a given character, by way of example.

The width of the character is arbitrarily selected as five units. In terms of a binary representation, this corresponds to the rotation of the pinions 250 and 252. The resultant turning of a rod 254 is not accompanied by an axial movement of the rod because a rack 256, journaled to the end of the rod, is meshed with a pinion 258; and the pinion 258 cannot turn because a rack 260 in mesh therewith is against a stop pin 262. The rotation of the rod 254 imparts upward movement to a rack 264, and downward movement to a rack 266. The rack 266 draws down a rod 268, which does not turn, but which draws down a rack 270. A rack 272 is moved upward, a rack 274 is moved downward and a rack 276 is moved upward. A rod 278 is simultaneously turned by the pinion 252 and moved upward by the thrust of the rack 276. The resultant upward movement of a member 280 represents the sum of these two movements. The member 280 moves a rod 282 upward. This rod does not turn, but moves a rack 284 upward, rotating a pinion 286 clockwise, and moving a rack 288 to the left. A rack 290, being stationary, will cause a spacing pinion 292, rotatably fixed to a follower 294, to rotate counterclockwise, moving the follower to the left.

It will be noted from the foregoing description that, in its broader aspects, the present invention is an improvement on the invention described in the copending application Serial No. 140,208, filed January 24, 1950, by Caldwell, Higonnet and Moyroud. In the present invention the accumulator elements (for example, the storage rods in Fig. 1) are linearly movable and are not operative through changes of volume. This construction has advantages in certainty of operation, in the avoidance of certain practical difficulties which are characteristic of fluid systems of the type disclosed, and in its adaptations for other features as herein described.

Having thus described our invention, we claim:

1. In apparatus for composing justified lines of written matter, the combination of a manual keyboard, a register actuated by the keyboard for storing information corresponding to a line of characters and interword spaces of said written matter, means for successively transcribing the information stored in the register into a line of said characters, two similar justifying devices, each adapted to control the spacing between the transcribed characters, and control means for connecting the register and said transcribing means alternately to said justifying devices, whereby said storage of one line takes place simultaneously with said transcription of a line previously stored in the register.

2. Apparatus according to claim 1 in which each justifying device comprises a displacement accumulator consisting of a linearly movable follower and means for accumulating successive displacements of the follower corresponding to the widths of the selected characters and interword spaces in a line, means for measuring the further amount of said displacements necessary to cause the aggregate displacement to reach a predetermined amount corresponding to the length of a justified line, means operative upon the accumulator after said measurement to cause successive displacements therein equal to said predetermined aggregate, and detachable means connecting the accumulator to said transcribing means.

3. In apparatus for composing justified lines of written matter, a device for controlling the justifying space increments to be added to a line of selected characters to be spaced in succession, comprising a lever rotatable about a fixed axis, a linearly movable follower, means for moving the follower to a position at a distance from said axis corresponding to the aggregate of said space increments, a counting device for counting said space increments by successive movements, means for holding the lever and follower in mechanical contact with the counting device after said movement of the follower, means for holding the lever rigid after said contact is established, a character displacement mechanism mechanically coupled with the follower, and means for moving said counting device by successive movements equal to but opposite in direction from said counting movements, whereby the follower is moved by successive displacements to said position.

4. In apparatus for composing justified lines of written matter, a device for controlling the justifying space increments to be added to a line of selected characters to be spaced in succession, comprising an interword justifying mechanism, an intercharacter justifying mechanism, each of said mechanisms comprising a lever rotatable about a fixed axis, a linearly movable follower, means for moving the follower to a position at a distance from said axis corresponding to the aggregate of space increments to be added by said mechanism, a counting device for counting by successive movements the space increments to be added by said mechanism, means for holding the lever and follower in mechanical contact with the counting device after said movement of the follower, and means for holding the lever rigid after said contact is established, a character displacement mechanism adapted to move according to the displacements of both followers, and means for moving both counting devices by successive movements equal to but opposite in direction from said counting movements, whereby both followers are moved by successive displacements to said positions relative to the axes of the corresponding levers.

5. In apparatus for composing justified lines of written matter, the combination of a displacement accumulator consisting of a linearly movable follower, a number of pinions having provision for causing displacements of said follower, a rack member having provision for engaging selected pinions according to the widths of selected characters and interword spaces, means for engaging the rack member with alternate sides of the pinions on each successive entries, and means for causing alternate rectilinear movements of the rack on successive width entries by distances corresponding to the point set of the selected characters to cause cumulative rotations of the pinions in a single direction, means for measuring the further amount of said displacements of the follower necessary to cause the aggregate displacement to reach a predetermined amount corresponding to the length of a justified line, a character displacement mechanism actuated by the accumulator after said measurement to space the selected characters successively, and reversing means for causing cumulative rotation of the pinions in the reverse direction to cause successive displacements of the accumulator equal to said predetermined aggregate.

6. In apparatus for composing justified lines of written matter, a displacement accumulator for accumulating the widths of selected characters and interword spaces in a line and for counting the justifying space increments to be added to a line, consisting of a linearly movable follower, width-counting pinion means having provision for causing displacements of said follower, increment-counting pinion means, a rack member having provision for engaging selected pinions according to selected increment positions and to the widths of selected characters and interword spaces, means for engaging the rack member with alternate sides of the pinions on successive width entries, and means for causing alternate rectilinear movements of the rack on successive width entries by distances corresponding to the point set of the selected characters to cause cumulative rotations of the pinions in a single direction.

7. In apparatus for composing justified lines of written matter, the combination of a flexible strip, a number of pulleys for accumulation or release of variable lengths of the flexible strip, storage means for accumulating lengths of the flexible strip corresponding to the widths of the selected characters and interword spaces in a line, means for measuring the additional accumulation of length necessary to cause the aggregate therein to reach a predetermined amount corresponding to the length of a justified line, means for releasing the flexible strip by successive lengths until the total released length is made equal to the said predetermined amount, and a character displacement member actuated by the flexible strip as it is being released to space the selected characters successively.

8. In apparatus for composing lines of written matter, the combination of a manual keyboard, a register actuated by the keyboard for storing information corresponding to a line of characters and interword spaces of said written matter, means for successively transcribing the information stored in the register into a line of said characters, and a justifying device for controlling the spacing between the transcribed characters, comprising a flexible strip, a number of pulleys for accumulation or release of variable lengths of the flexible strip, storage means actuated by the keyboard for accumulating lengths of the flexible strip corresponding to the widths of the selected characters and interword spaces in a line, means for measuring the additional accumulation of length necessary to cause the aggregate therein to reach a predetermined amount corresponding to the length of a justified line, means actuated by the register for releasing the flexible strip by successive lengths until the total released length is made equal to the said predetermined amount, and a character displacement member actuated by the flexible strip as it is being released to space the selected characters successively.

9. In apparatus for composing justified lines of written matter, the combination of a displacement accumulator consisting of a linearly movable rack, means for causing variable movements of the rack comprising a number of storage racks and axially movable rods having pinions cooperating with the storage racks, and storage means for causing cumulative displacements of the linearly movable rack corresponding to the widths of selected characters and interword spaces in a line, means for measuring the additional displacement of the linearly movable rack necessary to cause the aggregate displacement to reach a predetermined amount corresponding to the length of a justified line, means actuating the displacement accumulator to cause successive displacements having said predetermined aggregate, and a character displacement mechanism actuated by the displacement accumulator to space the selected characters successively.

10. In apparatus for composing justified lines of written matter, the combination of a mechanical adding device consisting of a linearly movable follower and mechanism coupled to the follower for accumulating successive displacements of the follower corresponding to the widths of the selected characters and interword spaces in a line, means for measuring the further amount of said displacements necessary to cause the aggregate displacement to reach a predetermined amount corresponding to the length of a justified line, a character displacement mechanism coupled to the follower and movable after said measurement to space the selected characters successively, and means operative upon the adding device after said measurement to cause successive displacements therein equal to said predetermined aggregate.

11. In apparatus for composing justified lines of written matter, the combination of a manual keyboard, a register actuated by the keyboard for storing information corresponding to a line of characters and interword spaces of said written matter, means for successively transcribing the information stored in the register into a line of said characters, a justifying device for controlling the spacing between the transcribed characters, comprising a mechanical adding device consisting of a linearly movable follower and mechanism coupled to the follower and actuated by the keyboard for accumulating successive displacements of the follower corresponding to the widths of the selected characters and interword spaces in a line, means for measuring the further amount of said displacements necessary to cause the aggregate displacement to reach a predetermined amount corresponding to the length of a justified line, means actuated by the register and said measuring means to cause successive displacements of the follower having said predetermined aggregate, and a character displacement mechanism coupled to the follower and movable after said measurement to space the selected characters successively.

12. In apparatus for composing justified lines of written matter, the combination of a manual keyboard, a register actuated by the keyboard for storing information corresponding to a line of characters and interword spaces of said written matter, means for successively transcribing the information stored in the register into a line of said characters, a justifying device for controlling the spacing between the transcribed characters, comprising a mechanical adding device consisting of a linearly movable follower and mechanism coupled to the follower and actuated by the keyboard for accumulating successive displacements of the follower corresponding to the widths of the selected characters and interword spaces in a line, means for measuring the further amount of said displacements necessary to cause the aggregate displacement to reach a predetermined amount corresponding to the length of a justified line, an interword counter for counting the number of interwords in the line, means actuated by the register, said measuring means and the interword counter to cause successive displacements of the follower having said predetermined aggregate, and a character displacement mechanism coupled to the follower and movable after said measurement to space the selected characters successively.

13. In apparatus for composing justified lines of written matter, the combination of a manual keyboard, a register actuated by the keyboard for storing information corresponding to a line of characters and interword spaces of said written matter, means for successively transcribing the information stored in the register into a line of said characters, a character displacement mechanism to space the characters successively, two similar justifying devices, each adapted to control the spacing between the transcribed characters and comprising a mechanical adding device consisting of a linearly movable follower and mechanism coupled to the follower and actuated by the keyboard for accumulating successive displacements of the follower corresponding to the widths of the selected characters and interword spaces in a line, means for measuring the further amount of said displacements necessary to cause the aggregate displacement to reach a predetermined amount corresponding to the length of a justified line, means operative upon the adding device after said measurement to cause successive displacements therein equal to said predetermined aggregate, and detachable means coupling the follower to the character displacement mechanism, and control means for connecting the register and character displacement mechanism alternately to said justifying devices, whereby said storage of one line takes place simultaneously with said transcription of a line previously stored in the register.

14. In apparatus for composing justified lines of written matter, a device for controlling the justifying space increments to be added to a line of selected characters to be spaced in succession, comprising an interword justifying mechanism, an intercharacter justifying mechanism, each of said mechanisms comprising a lever rotatable about a fixed axis, a linearly movable follower, means for moving the follower to a position at a distance from said axis corresponding to the aggregate of space increments to be added by said mechanism, a counting device for counting by successive movements the space increments to be added by said mechanism, means for holding the lever and follower in mechanical contact with the counting device after said movement of the follower, and means for holding the lever rigid after said contact is established, a character displacement mechanism coupled to both followers, and means for moving both counting devices by successive movements equal to but opposite in direction from said counting movements, whereby both followers are moved by successive displacements to said positions relative to the axes of the corresponding levers.

15. In apparatus for composing justified lines of written matter, the combination of a mechanical adding device consisting of a linearly movable follower and mechanism coupled to the follower for accumulating successive displacements of the follower corresponding to the widths of the selected characters and interword spaces in a line, space recording means for accumulating further displacements by amounts corresponding to blank spaces needed in the line, means for measuring the further amount of said displacements necessary to cause the aggregate displacement to reach a predetermined amount corresponding to the length of a justified line, a character displacement mechanism coupled to the follower and movable after said measurement to space the selected characters successively, and means operative upon the adding device after said measurement to cause successive displacements therein equal to said predetermined aggregate.

16. Apparatus according to claim 15 in which the space recording means include two displacing elements, means for causing each element to displace one-half of said further amount of displacement necessary to cause the aggregate of the accumulated displacements to reach said predetermined amount, means for causing one element to subtract its displacement before the characters are transcribed, and means for causing the other element to subtract its displacement after the characters are transcribed, whereby the transcribed line is centered.

17. In apparatus for justifying lines of written matter, the combination of a mechanical adding device including a movable element for measuring displacement, storage means to accumulate displacements corresponding to the selected characters and spaces in a line, whereby said element approaches a position corresponding to the justified line, increment means operable after the storage means to move the element to said position including means to produce displacements for the justification increments corresponding to said movement, spacing means coupled to the adding device to respond to the movements thereof to space the characters, and means to repeat the displacements of the storage means in reverse and to cause the increment means to produce displacements for the justification increments.

RENÉ HIGONNET.
LOUIS MOYROUD.

References Cited in the file of this patent

UNITED STATES PATENTS

| Number | Name | Date |
|---|---|---|
| 2,178,379 | Spievak | Oct. 31, 1939 |
| 2,379,862 | Bush | July 10, 1945 |